United States Patent [19]

Claas

[11] 4,367,757
[45] Jan. 11, 1983

[54] HARVESTER-THRESHER COMBINE

[75] Inventor: Helmut Claas, Harsewinkel, Fed. Rep. of Germany

[73] Assignee: Claas OHG, Harsewinkel, Fed. Rep. of Germany

[21] Appl. No.: 277,215

[22] Filed: Jun. 25, 1981

[30] Foreign Application Priority Data

Jun. 25, 1980 [DE] Fed. Rep. of Germany ....... 3023756
Sep. 1, 1980 [DE] Fed. Rep. of Germany ....... 3032863

[51] Int. Cl.³ ............................................. A01F 12/20
[52] U.S. Cl. .............................. 130/27 T; 130/27 H; 56/14.6
[58] Field of Search ........................... 130/27 T, 27 H; 56/14.6

[56] References Cited

U.S. PATENT DOCUMENTS

| | | | |
|---|---|---|---|
| 3,648,710 | 3/1972 | Hill | 130/27 T |
| 3,943,939 | 3/1976 | Hill | 130/27 T |
| 3,946,746 | 3/1976 | DeCoene et al. | 56/14.6 |
| 3,995,645 | 12/1976 | Hill | 130/27 T |
| 4,124,032 | 11/1978 | Cowan | 130/27 T |
| 4,205,511 | 6/1980 | Todd | 56/14.6 |

Primary Examiner—Robert A. Hafer
Attorney, Agent, or Firm—Michael J. Striker

[57] ABSTRACT

A harvester-thresher combine includes two threshing and separating drums which are mounted in a common housing for rotation in the same sense about parallel axes. The axes may extend in planes which extend parallel to the direction of movement of the combine, and then the leading ends of the drums are conical and have an external helical projection thereon. A twist-inducing conveyor may extend at an angle to the direction of movement of the combine into a corresponding cutout in the common housing. The drums may have equal or unequal lengths and in the latter case they are so arranged that the trailing end portions form a discharging step registering with a discharge opening of the housing. However, the parallel axes of the drums may also be situated in planes extending transversely of the direction of movement of the combine, and then the circumferential wall of the common housing is provided with an inlet opening for the severed cereal plants at one of its ends, and with a discharge opening for the straw at its other end. A pre-threshing unit may be arranged upstream of the inlet of the common housing.

8 Claims, 6 Drawing Figures

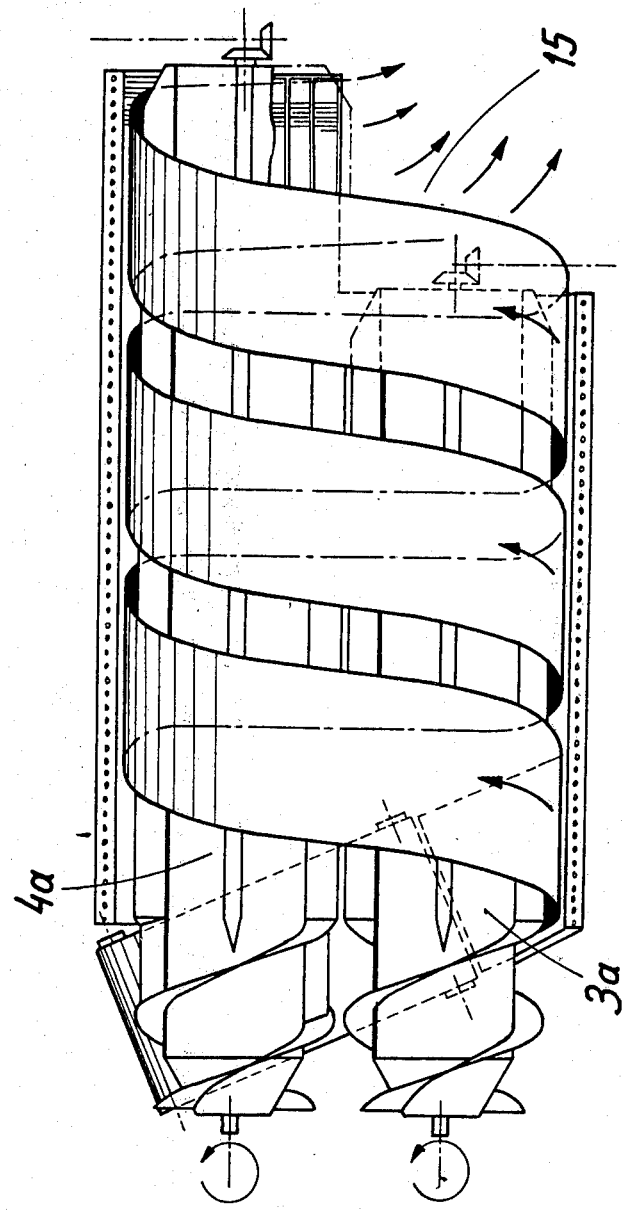

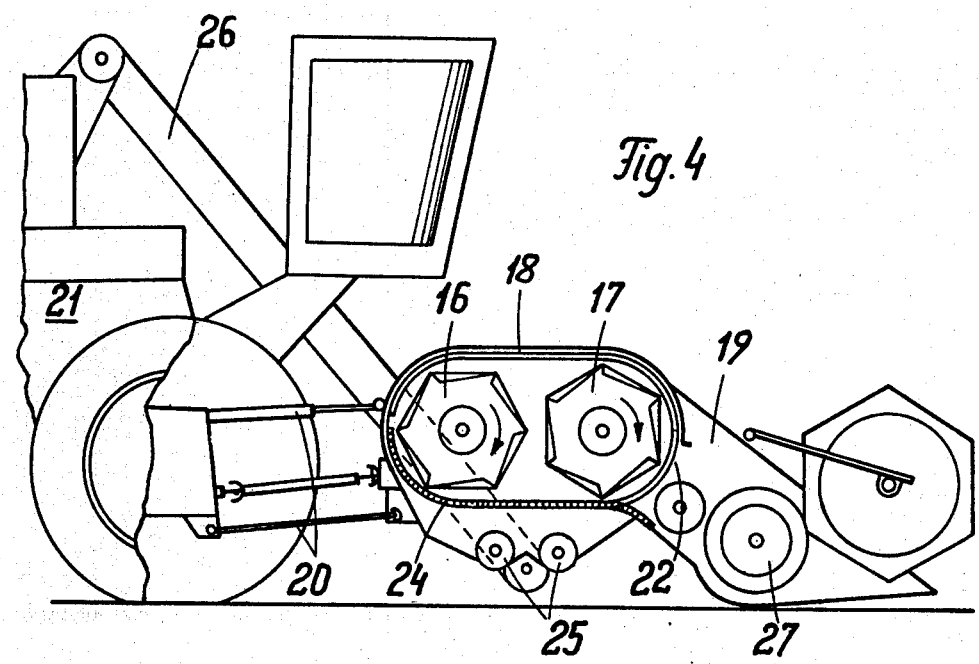
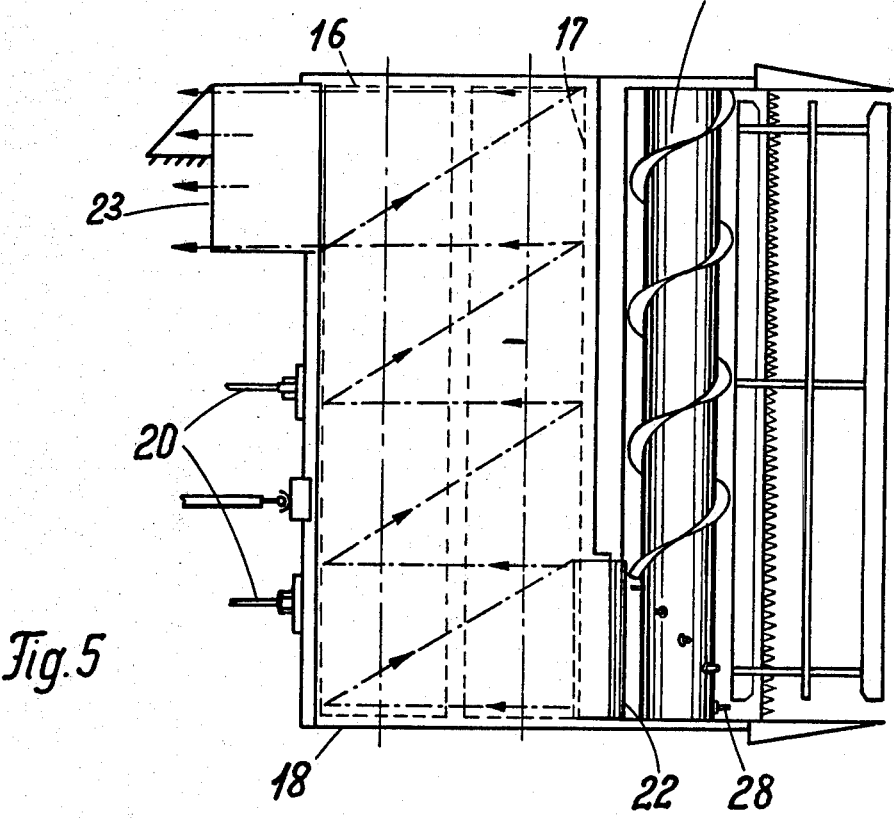

HARVESTER-THRESHER COMBINE

BACKGROUND OF THE INVENTION

The present invention relates to harvester-thresher combines in general, and more particularly to such employing more than one elongated threshing and separating element rotatable about its longitudinal axis.

In harvester-thresher combines operating with axial flow of the mowed cereal plants, it has been proposed to arrange two threshing drums next to one another, and to arrange a separate housing member provided at its lower region with cage bars around each of the threshing drums. In this construction, there are thus being used two completely independent and separate threshing units which are merely arranged next to one another in order to increase the amount of the mowed plants which the harvester-thresher combine is capable of handling, that is, threshing and/or separating into grain, straw and chaff. One very detrimental consequence of this conventional construction is that the cereal plants, after being mowed, are at first conveyed in a single stream which is subsequently subdivided into two partial streams each leading into one of the housing members for threshing therein. This subdivision is very difficult to achieve, as shown by experience, especially in view of the fact that the stems or stalks of the mowed cereal plants become intertwined in the original stream right after being cut. Thus, a not so rarely encountered problem in the combines of this construction is the formation of a bale of intertwined stalks or plants in front of the inlets of the separate housings, which means that the operation of the harvester-thresher combine must be interrupted once the occurrence of this situation has been noticed, and the jam in front of the threshing units must be manually removed in a rather time-consuming and wasteful operation. However, even in the absence of such an accumulation, the operation of the harvester-thresher combine is far from ideal, particularly due to the fact that the severed plants are unequally distributed to the two adjacent threshing units and, consequently, such units are loaded to different degrees.

A further important disadvantage of the harvester-thresher combines of this construction is that, owing to the extreme diversion of the streams of the severed cereal plants, the stalks thereof, which are to become straw, are comminuted to an undesirably high degree. This has several deleterious consequences, namely, that the straw has a high proportion of short separate sections, that undue burden is put on the airstream segregating arrangement, and that, as a result of this, there is an undesirably high amount of grain loss downstream of the harvester-thresher combine.

SUMMARY OF THE INVENTION

Accordingly, it is a general object of the present invention to avoid the disadvantages of the prior art.

More particularly, it is an object of the invention to provide a harvester-thresher combine equipped with at least two threshing and separating elements rotatable about parallel axes, which is not possessed of the above-discussed and other disadvantages of the conventional combines of this construction.

A further object of the present invention is to so design the harvester-thresher combine of the type here under consideration as to assure flawless passage of the severed cereal plants therethrough and to minimize the amount of grain loss.

It is a concomitant object of the invention to develop a harvester-thresher combine which is simple in construction, easy to operate, and reliable nevertheless.

In pursuance of these objects and others which will become apparent hereafter, one feature of the present invention resides in a harvester-thresher combine including a support movable in a predetermined direction on an agricultural field from which cereal plants are to be harvested, and an arrangement for mowing the plants, briefly stated, in a combination comprising at least two threshing and separating elements, especially drums, mounted on the support for rotation about parallel axes; means for rotating the threshing and separating elements about the respective axes thereof in the same sense of rotation; and a common housing member mounted on the support and at least partially commonly surrounding the threshing and separating elements. The provision of the common housing member for the threshing and separating elements quite surprisingly avoids the above-discussed drawbacks of the conventional constructions.

In accordance with one concept of the present invention, at least that region of the common housing member which is disposed below the threshing and separating elements is perforated to let at least the grain separated from the straw by the threshing and separating elements during their rotation pass therethrough. In accordance with another concept of the invention, the axes of rotation of the threshing and separating elements extend in planes which are substantially parallel to the direction of movement of the support during the harvesting operation of the combine. Then, in order to achieve an unproblemematical entry of the severed plants into the common housing member along a helical path, the common housing member is provided with a cutout at the leading end thereof, and a twist-inducing conveyor is provided which is mounted on the support and has a run which engages the plants and entrains the same for joint movement in a path enclosing an angle with the direction of movement of the support and leading into the cutout. The helical entry of the severed plants is further improved when, in accordance with a further advantageous facet of the present invention, the threshing and separating drums are provided, at their respective leading ends, with conical end portions, which are equipped with means for drawing the severed plants into the common housing, in the form of helically extending projections on the conical end portions of the drums.

It is further advantageous when, in accordance with a further expedient proposed by the present invention, the threshing and separating elements are elongated in their axial directions and when they have different axial lengths and are so arranged relative to one another that a discharging step is formed at the trailing end portions of the elongated elements. Under these circumstances, it is advantageous to provide the common housing member with a discharge opening at the region of the discharging step.

Experience has shown that the harvester-thresher combine of the above-discussed construction already gives excellent performance and results with respect to the smooth flow of the mowed plants thereinto and therethrough as well as with respect to minimizing the grain losses, under most of the conditions encountered during the operation of the combine. However, when the combine of this construction was operated under very adverse operating conditions, it was observed, in some cases, that the threshing effect was less than complete. Therefore, with the object in mind of improving the degree of dissocation of the grain from the cereal plants, it is proposed, in accordance with another concept of the invention, to arrange a threshing unit ahead of the leading end of the common housing, this threshing unit including a threshing drum extending over the entire width of the common housing member and mounted for rotation about an axis extending normal to the direction of movement of the support, means for rotating the threshing drum about its axis, and a threshing cage partially surrounding the threshing drum. When this expedient is used, there is obtained the advantage that the cereal plants are first pre-threshed in the threshing unit, whereupon the threshing operation is completed and the grain separated from the straw in the aforementioned common housing, which is arranged downstream of the threshing unit, due to the operation of the threshing and separating elements therein.

In accordance with an additional aspect of the invention, the axes of rotation of the threshing and separating elements are arranged in planes extending substantially normal to the direction of movement of the support during the operation of the harvester-thresher combine. Then, a particularly simple and otherwise advantageous construction is obtained when the common housing member is mounted on a guiding chute which constitutes a part of the support and extends between the mowing arrangement and the threshing and separating elements. In order to assure that the cut plants enter the interior of the common housing member at one of its ends, a feeding roller is rotatably mounted on the support ahead of the common housing and has a plurality of feeding tines at one of its ends. Then, an intermediate wall is provided, which is mounted on or integral with either the chute or the common housing member, extends across the trajectory of movement of the cut plants on the chute, and bounds an inlet opening for the plants which registers with the feeding tines. To force the plants to traverse the entire axial length of the common housing member before discharge, the common housing member has an outlet opening which is offset axially of the threshing and separating elements from the inlet opening, and especially arranged at the end of the housing which is remote from the inlet opening. The effectiveness of the threshing operation is further improved when the common housing member is provided at its internal surface with elongated guiding members which extend toward the threshing and separating elements and partially surround the same.

The novel features which are considered as characteristic of the invention are set forth in particular in the appended claims. The improved harvester-thresher combine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a view similar to FIG. 2 but showing two threshing and separating drums of unequal lengths;

FIG. 4 is a view similar to FIG. 1 but showing a modification of the harvester-thresher combine;

FIG. 5 is a top plan view of a part of the modification of FIG. 4; and

DETAILED DESCRIPTION OF THE PREFERRED EMBODIMENTS

Figure 1:
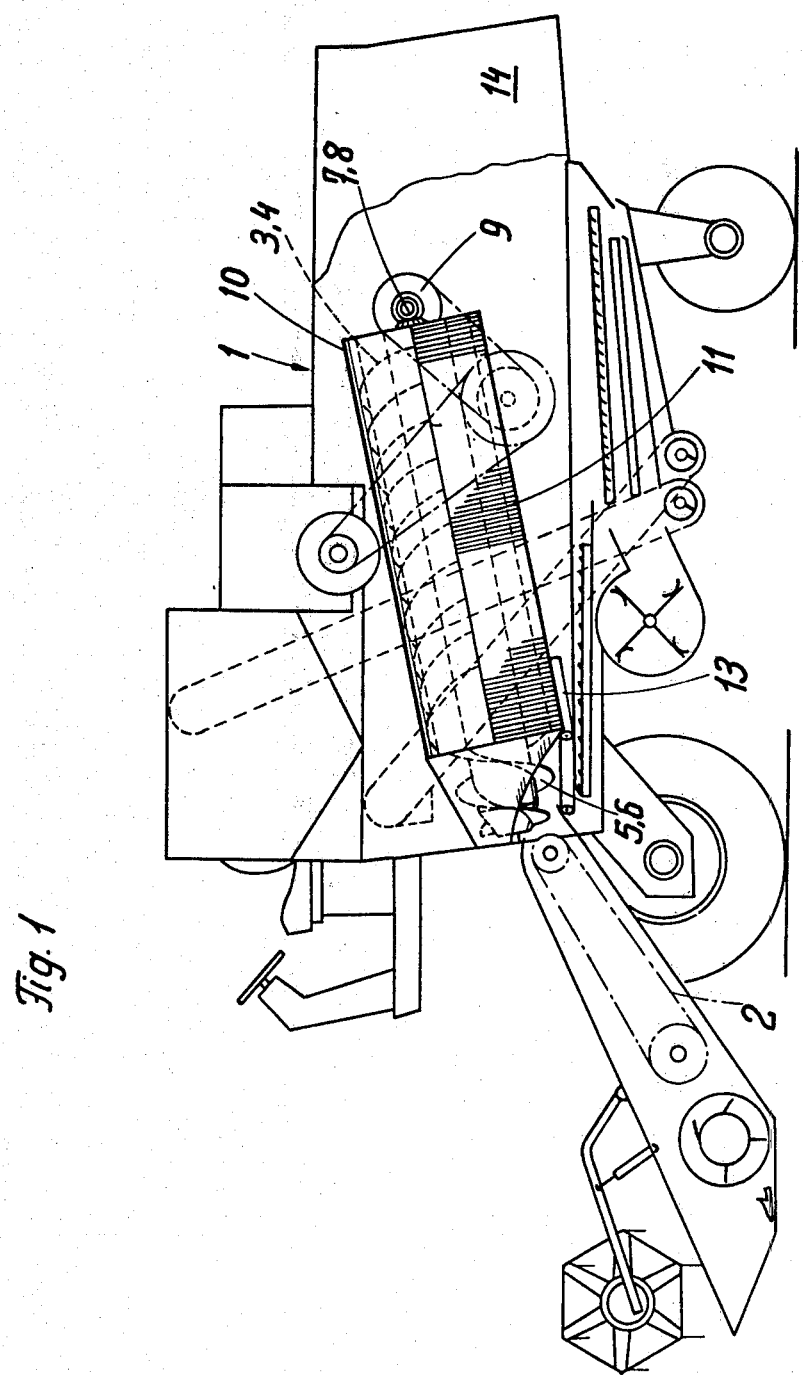
FIG. 1 is a partially sectioned side elevational view of a harvester-thresher combine according to the present invention.

Referring now to the drawing in detail, and first to FIG. 1 thereof, it may be seen that the reference numeral 1 has been used to identify a self-propelled harvester-thresher combine which includes many parts which are without bearing on the proper understanding of the present invention and, therefore, are only diagrammatically indicated in the drawing and will not be referred to in any great detail, if at all, in this detailed description.

The combine 1 includes frontwardly located mowing and feeding devices which are of entirely conventional constructions. Suffice it to say in this context that they mow the cereal plants and position the same in a layer on a conveyor 2 which is arranged in a guiding chute or trough. The conveyor 2 then feeds the severed plants or stalks to a pair or more threshing and separating drums 3 and 4 (individually shown in FIGS. 2 and 3). The drums are mounted for rotation about axes extending in planes parallel to the direction of movement of the combine 1 during its operation. The leading ends of the drums 3 and 4 have conical configurations, and are provided with helically extending projections or blades 5 and 6 at the circumferential surfaces thereof. The drums 3 and 4 can be driven in rotation by means of a driving arrangement which includes respective bevel gears 7 and 8 as well as a rotatable pulley 9 for a V-belt transmission. The driving arrangement 7, 8, and 9 drives both drums 3 and 4 in the same sense of rotation when the combine 1 is in operation.

The two threshing and separating drums 3 and 4 are accommodated in a common housing 10 which is configurated at its region disposed underneath the drums 3 and 4 as a threshing and separating cage 11. The cage is provided, at its leading end at which the severed plants enter the interior of the housing 10 with a step 12 which is inclined relative to the direction of movement of the combine 1. A twist-inducing conveyor 13 is so arranged that one of its ends extends, at the same inclination to the direction of movement, into the step or cutout 12. The severed plants are first fed by the feeding conveyor 2 to the region of the helical projections 5 and 6 and to that of the inclinedly arranged twist-inducing conveyor 13, so that the latter, in cooperation with the helical projections 5 and 6, diverts the severed plants and causes the same to proceed in a direction enclosing an angle with the direction of movement of the combine 1 and thus with the axes of the drums 3 and 4. This initiates the movement of the severed plants in a helical course around the threshing and separating drums 3 and 4. The severed plants are then threshed and the so dissociated grain is separated therefrom as the plants progress through the interior of the common housing 10 in the aforementioned helical course toward a discharge duct or container 14.

Figure 2:
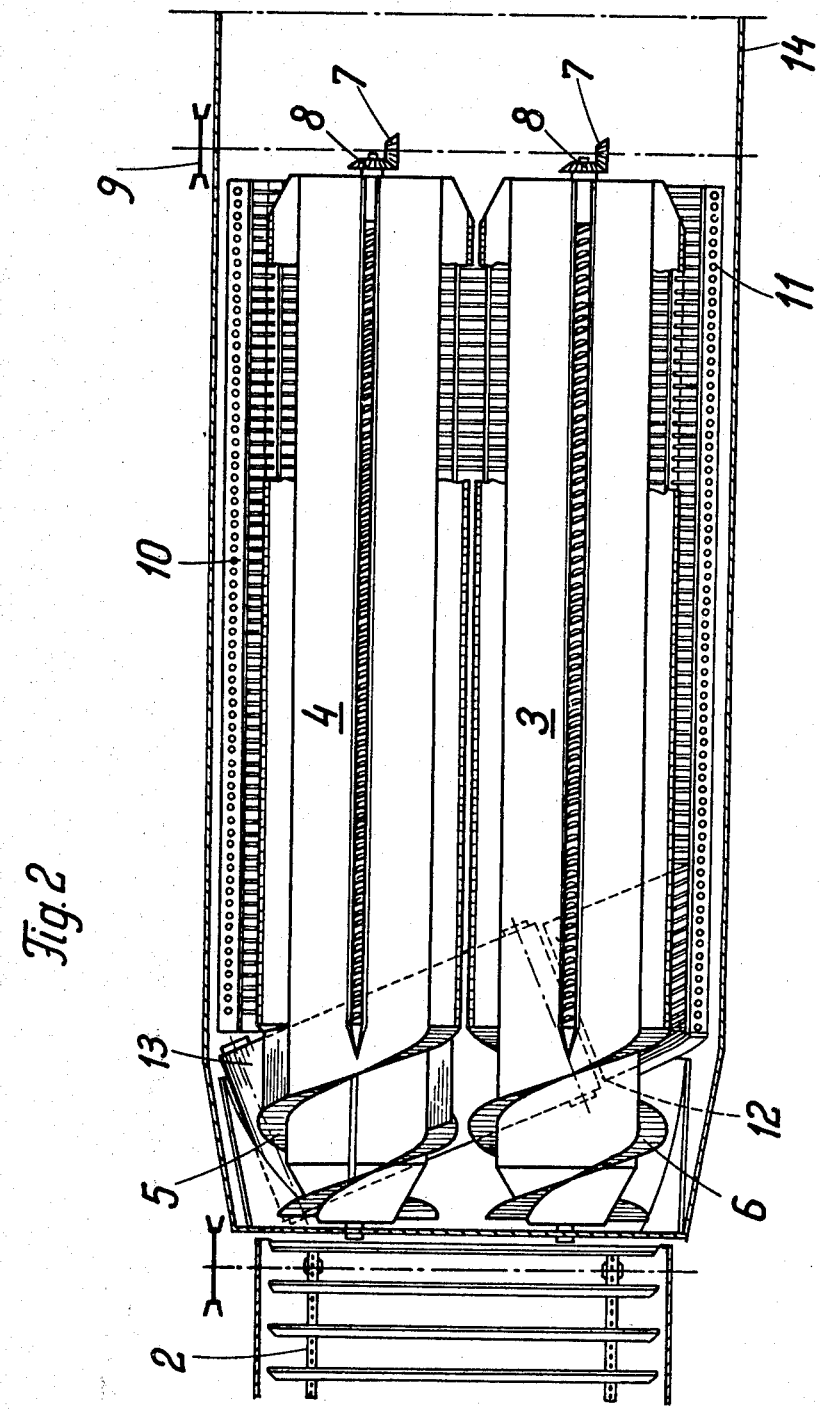
FIG. 2 is a top plan view of two threshing and separating drums of the same length as accommodated in a common housing of FIG. 1.

As shown in FIG. 2, both drums 3 and 4 can have the same length. However, as shown in FIG. 3, the drums 3 and 4 may be of unequal axial lengths (as indicated at 3a, 4a) so that a discharge step 15 is formed at the trailing ends of the drums 3a and 4a, which facilitates and improves the discharge of the straw.

FIGS. 4 and 5 show a modification of the concept of the present invention which differs from the structure of FIGS. 1 to 3 in that the threshing and separating drums, here indicated at 16 and 17, which are rotatable about the aforementioned parallel axes, are again accommodated in a common housing 18, but this time the housing 18 as well as the axes of rotation of the drums 16 and 17 extend transversely of the direction of movement of the combine 1 and over the entire width thereof. The two drums are again rotated in the same sense. The combine 1 further includes a feeding duct or chute 19, and the common housing 18 is mounted on the latter. Also, unlike in FIGS. 1 to 3, where a self-propelled agricultural machine has been shown, the combine 1 of FIGS. 4 and 5 is an implement which is connected, by means of a three-point connection 20, to a tractor 21. In this construction, the severed cereal plants enter the interior of the common housing 18 through an inlet opening 22 which is arranged at one end of the housing 18, and the threshed straw leaves the interior of the housing 18 through an outlet opening 23 after the threshing and separating operation has been completed. The outlet opening 23 is arranged at the other end of the common housing 18, that is, remotely from the inlet opening 22, so that the severed plants have to follow the course indicated in broken lines in FIG. 5 before reaching and being discharged as straw through the outlet opening 23, so that they will be subjected to the threshing and separating action of the drums 16 and 17 as they follow this course. Even here, the lower part 24 of the common housing 18 is constructed as a cage, that is, it is perforated, so that grain, chaff and/or debris or short sections of straw can pass therethrough and be fed by screw conveyors 25 to the lower end of an elevator 26 which transports this bulk material, in a conventional manner, to an accumulator mounted on the implement or combine 1 or, as shown, on the tractor 21 or a truck traveling along the latter.

In order to assure that all of the severed plants will indeed pass through the inlet opening 22, there is provided a roller 27 of otherwise conventional construction ahead of the inlet opening and the remainder of the common housing 18, this roller 27 being provided, frontwardly of the inlet opening 22, with a plurality of feeding tines 28.

Figure 6:
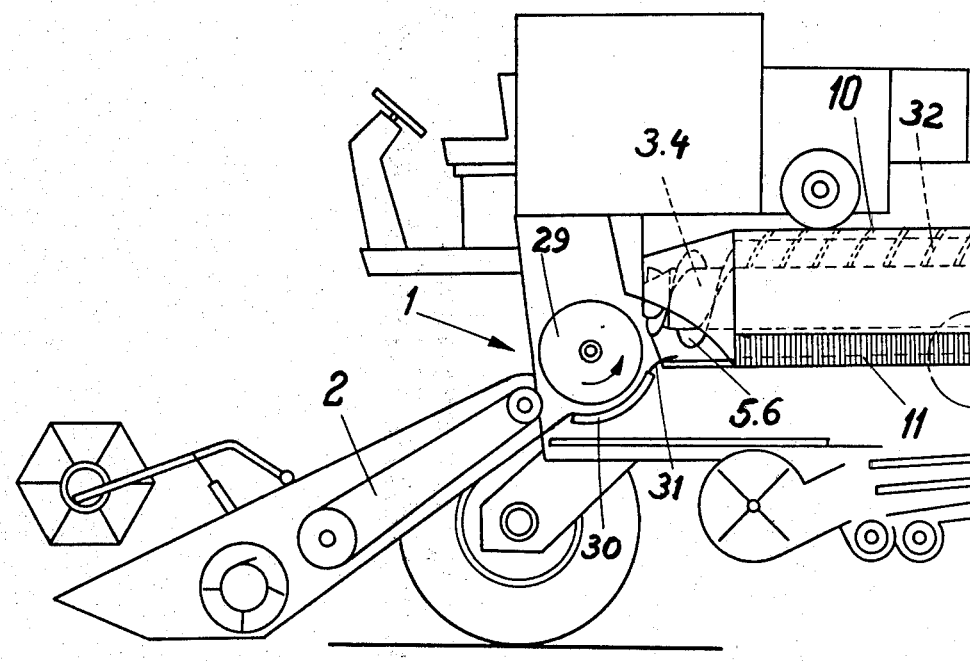
FIG. 6 is a partial view of the combine of FIG. 1 with an additional threshing unit.

FIG. 6 shows an improvement of the thresher-harvester combine 1 which is so similar to that of FIGS. 1 to 3 that the same reference numerals have been used therein to indicate identical or similar parts. In addition to the parts described above in connection with the description of the structure illustrated in FIGS. 1 to 3, the combine 1 of FIG. 6 includes an additional threshing drum 29 which extends transversely of the combine frontwardly of the inlet end of the housing 10 and which is accommodated in a threshing cage 30. The drum 29 is rotated about its longitudinal axis during the operation of the combine 1 so as to pre-thresh the cereal plants prior to their admission into the common housing 10. A transfer member of sheet material 31 bridges the gap between the cage 30 and the common housing 10 so that the pre-threshed straw-plant-grain-chaff mixture can slide thereon between the cage 30 and the common housing 10. FIG. 6 also shows that the housing 10 may be provided at its internal surface with a plurality of guiding projections 32 which extend toward the drums 3 and 4 and partially surround the same and which guide the aforementioned mixture during its advancement through the interior of the housing member 10.

It will be understood that each of the elements described above, or two or more together, may also find a useful application in other types of arrangements differing from the type described above.

While the invention has been illustrated and described as embodied in a harvester-thresher combine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a harvester-thresher combine including a support movable in a predetermined direction on an agricultural field from which cereal plants are to be harvested, and an arrangement for mowing the plants, a combination comprising at least two elongated threshing and separating drums mounted on the support for rotation about parallel axes extending along the predetermined direction such that said threshing and separating drums have respective leading and trailing ends as considered in the predetermined direction; means for rotating said threshing and separating drums about the respective axes thereof in the same sense of rotation; and a common housing mounted on the support and bounding a substantially oval chamber which accommodates both of said threshing and separating drums and has a common inlet opening at said leading, and a common discharge opening at said trailing, ends of said threshing and separating drums.

2. The combination as defined in claim 1, wherein at least that region of said common housing which is disposed below said threshing and separating elements is perforated to let at least the grain separated from the straw by said threshing and separating elements during the rotation thereof pass therethrough.

3. The combination as defined in claim 1, wherein said common housing has elongated guiding members extending from the internal surface thereof toward said threshing and separating drums and partially surrounding the latter.

4. The combination as defined in claim 1, wherein said common housing has a cutout at the leading end thereof; and further comprising a twist-inducing conveyor mounted on the support and having a run advancing in a path enclosing an angle with the predetermined direction into the cutout.

5. The combination as defined in claim 1, wherein said threshing and separating drums have conical end portions at said leading ends thereof; and further comprising means for drawing the mowed plants into said common housing, comprising helically extending projections on said conical end portions of said elongated drums.

6. The combination as defined in claim 1, wherein said threshing and separating drums have different axial lengths and are so arranged relative to one another that a discharging step is formed at said trailing ends of said elongated drums.

7. The combination as defined in claim 6, wherein said discharge opening is situated at the region of said discharging step.

8. The combination as defined in claim 1; and further comprising a threshing unit arranged ahead of the leading end of said common housing and including a threshing drum mounted on said support for rotation about an axis extending substantially normal to the predetermined direction, means for rotating said threshing drum, and a threshing cage partially surrounding said threshing drum.

* * * * *